United States Patent
Snowball (10) Patent No.: US 9,817,619 B2
(45) Date of Patent: Nov. 14, 2017

(54) PRINTING TO A PAPER-LIKE DEVICE

(71) Applicant: Xerox Corporation, Norwalk, CT (US)

(72) Inventor: David James Snowball, Sandy (GB)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 14/804,823

(22) Filed: Jul. 21, 2015

(65) Prior Publication Data

US 2017/0024169 A1    Jan. 26, 2017

(51) Int. Cl.
*G06F 3/12* (2006.01)

(52) U.S. Cl.
CPC ............ *G06F 3/124* (2013.01); *G06F 3/1219* (2013.01); *G06F 3/1229* (2013.01); *G06F 3/1291* (2013.01)

(58) Field of Classification Search
CPC ... H04N 1/00347; G06F 3/147; G06F 3/1205; G06F 3/1208; G06F 3/1242; G06F 3/1265; G06F 3/1271; G06F 3/129; G06F 2206/1512; G09G 2340/0414; G09G 2340/0421; G09G 2340/0478; G09G 2370/16; G09G 2380/02

See application file for complete search history.

(56) References Cited

U.S. PATENT DOCUMENTS

| | | | | |
|---|---|---|---|---|
| 2008/0186527 A1* | 8/2008 | Eguchi | .................. | H04N 1/2307 358/1.14 |
| 2011/0019227 A1* | 1/2011 | Mizumukai | ............ | G06F 3/1247 358/1.15 |
| 2011/0069347 A1* | 3/2011 | Kawabuchi | .............. | G06F 3/147 358/1.15 |
| 2011/0141119 A1* | 6/2011 | Ito | .......................... | G09G 5/003 345/441 |
| 2012/0268780 A1* | 10/2012 | Kawano | ................. | G06F 3/1221 358/1.15 |
| 2014/0055802 A1* | 2/2014 | Otake | ..................... | B41J 3/4076 358/1.13 |

* cited by examiner

*Primary Examiner* — Henok A Shiferaw (57) ABSTRACT

A method, non-transitory computer readable medium and apparatus for printing on a paper-like device are disclosed. For example, the method includes configuring a print path to the paper-like device, providing an option to print a document on the paper-like device, receiving a selection of the option to print the document on the paper-like device and sending a print command to the paper-like device via the print path to print the document on the paper-like device.

15 Claims, 4 Drawing Sheets

PRINTING TO A PAPER-LIKE DEVICE

The present disclosure relates generally to printing and, more particularly, to a method and apparatus for printing to a paper-like device.

BACKGROUND

Millions of sheets of paper are used daily around the world for printing various documents, advertisements, banners, and the like. The constant use of paper has an environmental impact due to cutting down of trees and carbon emissions. Although more efforts to recycle paper are being made, the amount of paper that is being used still leads to a significant environmental impact.

Currently, paper-like devices are being created and developed that are thin, flexible and look similar to that of paper. The paper-like devices currently allow for uploading of images onto the paper-like device. However, no printing methods have been developed for the paper-like devices.

SUMMARY

According to aspects illustrated herein, there are provided a method, non-transitory computer readable medium and apparatus for printing on a paper-like device. One disclosed feature of the embodiments is a method that configures a print path to the paper-like device, provides an option to print a document on the paper-like device, receives a selection of the option to print the document on the paper-like device and sends a print command to the paper-like device via the print path to print the document on the paper-like device.

Another disclosed feature of the embodiments is a non-transitory computer-readable medium having stored thereon a plurality of instructions, the plurality of instructions including instructions which, when executed by a processor, cause the processor to perform operations that configure a print path to the paper-like device, provide an option to print a document on the paper-like device, receive a selection of the option to print the document on the paper-like device and send a print command to the paper-like device via the print path to print the document on the paper-like device.

Another disclosed feature of the embodiments is an apparatus comprising a processor and a computer-readable medium storing a plurality of instructions which, when executed by the processor, cause the processor to perform operations that configure a print path to the paper-like device, provide an option to print a document on the paper-like device, receive a selection of the option to print the document on the paper-like device and send a print command to the paper-like device via the print path to print the document on the paper-like device.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method and apparatus for printing on a paper-like device. As discussed above, millions of sheets of paper are used daily around the world for printing various documents, advertisements, banners, and the like. The constant use of paper has an environmental impact due to cutting down of trees and carbon emissions. Although more efforts to recycle paper are being made, the amount of paper that is being used still leads to a significant environmental impact.

Currently, paper-like devices are being created and developed that are thin, flexible and look similar to that of paper. The paper-like devices currently allow for uploading of images onto the paper-like device. However, no printing methods have been developed for the paper-like devices.

A paper-like device may be defined to be a thin, flexible device. The paper-like device may be a low cost or cheap display that has very limited processing capabilities and memory capacity. The processing capabilities may be limited to interpreting print commands, controlling display of an image and processing simple input/output commands to keep costs of the paper-like device very low. In one embodiment, the paper-like device may be used to display an image in black and white or color. One example of a paper-like device may be a PaperTab developed by Plastic Logic Germany®.

Embodiments of the present disclosure provide a method for printing on the paper-like device. For example, a print command that is typically used to cause a printer to print an image onto a print media (e.g., paper) may be used to cause the paper-like device to "print" the image on the paper-like device. In other words, a print command is used without a printing device, a multi-function device, a paper transport path, paper, and the like.

Notably, the image is not "displayed" from a file. For example, a monitor may display an image from a mass storage device, from a source file on a server in the cloud or transferred from an image on another device via a wired or wireless connection. However, the displayed images are not in response to a print command typically used from an endpoint device to print a document or an image. Said another way, the image is not "displayed" on the paper-like device from a data file in a file directory system (e.g., printing to a file that is saved in a file directory system to be displayed at a later time).

Rather, the print command in the present disclosure causes the image or document to be sent for immediate "printing" onto the paper-like device. The image or document is not saved on a long term or mass storage device for later display (e.g., in a file directory structure). After the document is "printed," the document may be saved to a long term storage.

Figure 1:
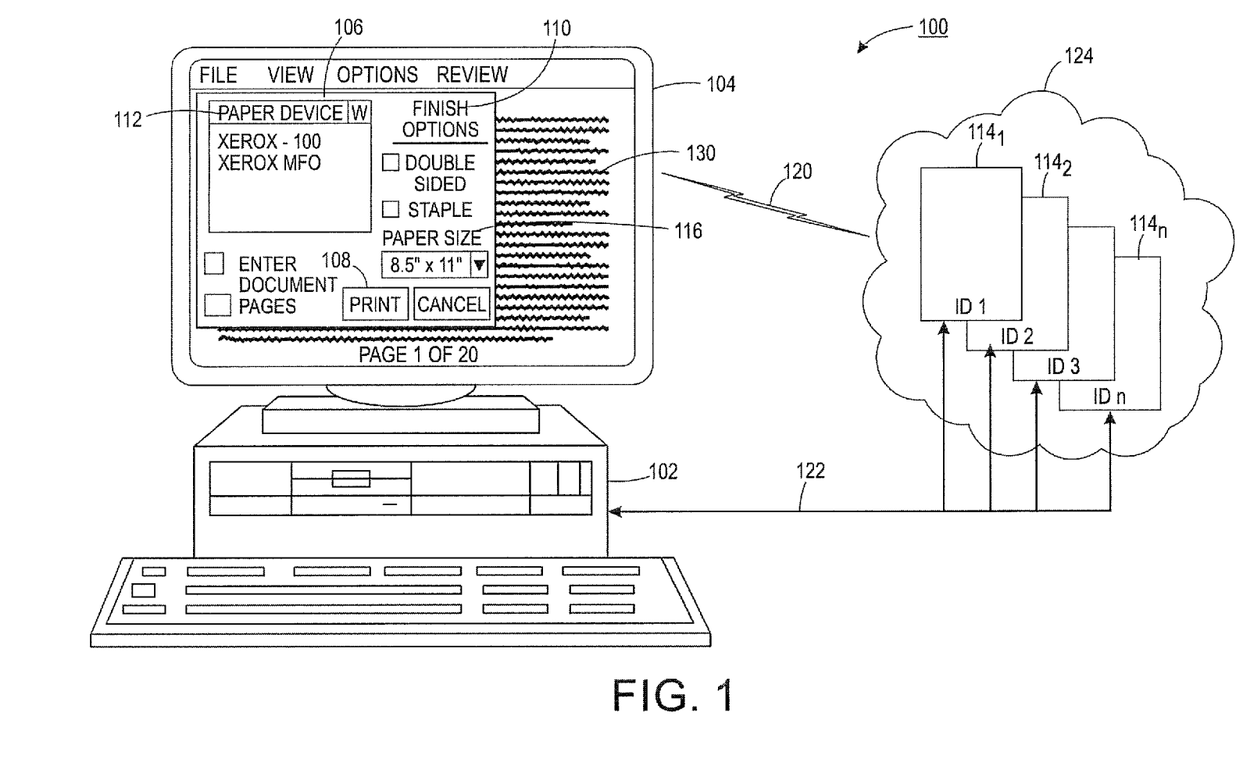
FIG. 1 illustrates an example block diagram of a system of the present disclosure.

FIG. 1 illustrates an example system 100 of the present disclosure. In one embodiment, the system 100 includes an endpoint device 102. In one embodiment, the endpoint device 102 may include a processor and a memory. In one embodiment, the endpoint device 102 may be deployed as a computer illustrated in FIG. 4, and discussed below. In one embodiment, the endpoint device 102 may be a desktop computer or a mobile endpoint device (e.g., a tablet computer, a laptop computer, a smart phone, and the like).

In one embodiment, the endpoint device 102 may include a display 104. A user may use the display and the endpoint device 102 to produce an image or a document 130. The user may then select a print menu that is provided via a graphical user interface (GUI) 106 that includes an option to print 112 the image or the document 130 to one or more paper-like devices $114_1$ to $114_n$ (herein also referred to individually as a paper-like device 114 or collectively as paper-like devices 114).

In one embodiment, the endpoint device 102 may configure or create a print path for each one of the paper-like devices 114. For example, the print path may be configured using a driver that is installed on the endpoint device 102 that allows the endpoint device 102 to recognize and communicate with each one of the paper-like devices 114. In one embodiment, the print path may use printing communication protocols such as a page description language (PDL) (e.g., PostScript, and the like). In one embodiment, the print path may be via a wireless connection 120 or a wired connection 122.

In one embodiment, the paper-like devices 114 may be remotely located from the endpoint device 102 at a print station. In one embodiment, a managed print service or service provider may provide the paper-like devices 114 at the print station. The managed print service may track an inventory of the paper-like devices 114 that are being used and that are available. In one embodiment, the paper-like devices 114 may each have a unique identification number (e.g., ID1 to IDn) for tracking and communication purposes.

In one embodiment, the paper-like devices 114 may have different sizes. For example, the paper-like device $114_1$ may have a display that corresponds to an 8.5 inch by 11 inch paper size, the paper-like device $114_2$ may have a display that corresponds to an A4 paper size, the paper-like device $114_3$ may have a display that correspond to an 11 inch by 17 inch paper size, and so forth.

Once the endpoint device 102 configures the print path for each one of the paper-like devices 114, the user may select a paper-like device 114 for printing the document 130 via the option to print 112 from the GUI 106. In one embodiment, the GUI 106 may also include finishing options 110, a paper size option 116 and a print command button 108. It should be noted that the various options in the GUI 106 are provided only as examples and that other paper or print options may be provided in the GUI 106. For example, the option to print 112 may include all current print options not shown, e.g., Secure Print, Banner Sheets, and the like.

In one embodiment, depending on the paper size that is selected from the paper size option 116, the print command may be sent to one of the paper-like devices 114 that corresponds to the selected paper size. In one embodiment, depending on the number of pages that need to be printed and/or a type of finishing that is selected from the finishing options 110, the document 130 may be printed on one or more of the paper-like devices 114.

For example, when the document 130 is only a single page, the print command may be sent to an available paper-like device 114. In another embodiment, if the document 130 is a multiple page document that has a stapled option, the document 130 may be sent to a single available paper-like device 114.

In one embodiment, the available paper-like devices 114 may be communicated to the endpoint device 102. As a result, the user is not required to specify which paper-like device 114 to send the document 130 to for printing. Rather, based on the available paper-like devices 114, the endpoint device 102 may modify the print command 108 to include the unique identifier of the available paper-like devices 114 to ensure that the print command 108 is sent to the available paper-like devices 114. In one embodiment, the GUI 106 may include a message after the print command 108 is sent to notify the user the unique ID(s) of the paper-like devices 114 that the document 130 will be printed on such that the user may take the correct paper-like devices 114 at a print station.

In one embodiment, a password may be displayed to the user on the GUI 106 after the print command 108 is sent to the available paper-like devices 114. The password may be used to access the printed document 130 on the paper-like devices 114 to ensure security. As a result, any other user who did not initiate the print command 108 would not know the password and be unable to access the printed document 130 from the paper-like devices 114 that were used to print the document 130.

In one embodiment, a user may release the paper-like device 114 and return the paper-like device 114 to the print station when the user is done with the paper-like device 114. As a result, the password may be reset and the paper-like device 114 may be checked back into the inventory as being available for printing so that another user may print to the paper-like device 114.

In another embodiment, the available paper-like devices 114 may be displayed to the user via the GUI 106. As a result, the user may select the paper-like devices 114 that appear in the GUI 106. For example, a group of employees may be in a meeting and each has his or her own paper-like device 114 with a unique ID. Each employee may send the user his or her unique ID for his or her paper-like device. Subsequently, if the user needs to print a copy of a document 130 to each employee in the meeting, the user may select each employee's paper-like device 114 based on the unique IDs and print the document 130 to the paper-like device 114 of each employee. In one embodiment, the unique ID of each employee's paper-like device 114 may be provided as selectable options in the option to print 112 of the GUI 106.

In one embodiment, after the document is printed to the paper-like device 114 of the each employee, the user may delegate some control over the document 130 to each of the employees. For example, each of the employees may then edit the document 130 on his or her respective paper-like device 114, send the document 130 to another employee's paper-like device 114, save the document 130 to an external storage device, and the like.

In one embodiment, when multiple pages are sent to a single paper-like device 114, only a single page may be displayed at a time. As noted above, the paper-like device 114 may be very limited in processing capability and memory to make the paper-like device 114 a low cost product that can replace paper. As a result, the paper-like device 114 may not be able to store multiple pages of a document on the paper-like device 114. In one embodiment, the print command 108 may cache or temporarily store the multiple pages of the document 130 in a cache memory of the endpoint device 102. In other words, the document 130 is not stored in a mass storage device such as a hard disk drive. The first page of the document 130 may be printed onto the paper-like device 114.

After the first page is processed, the paper-like device 114 may send a signal back to the endpoint device 102 that the first page is processed. In one embodiment, processing the first page may be defined as consuming the first page (e.g., reading or viewing) or storing the first page to an external storage device. For example, the user may read the page and provide a next page input (e.g., the signal that is sent to the endpoint device 102) on the paper-like device 114. In another example, the user may store the first page to an external storage device (e.g., save in the non-volatile memory of the endpoint device 102, a portable disk drive, and the like) and then provide a next page input.

After the signal is received by the endpoint device 102, the endpoint device 102 may print a second page of the document 130. The process of printing and receiving the signal that the page has been processed may be repeated until all pages of the document 130 have been printed onto the paper-like device 114. In one embodiment, the document 130 may be temporarily stored in a cache until the user indicates that the user has finished viewing the document 130, at which time the document 130 may be erased from the cache.

In another embodiment, if no stapling is required or a doubled sided option is selected from the finishing options 110, each side or each page of the document 130 may be printed onto a separate or different paper-like device 114. For example, for a two page document that does not require stapling, the two page document may be printed onto the paper-like device $114_1$ and the paper-like device $114_2$. In one embodiment, if multiple copies of a multi-page document 130 is selected from the finishing options 110, then copies of the document 130 may be printed onto different paper-like devices 114 that are available.

Figure 2:
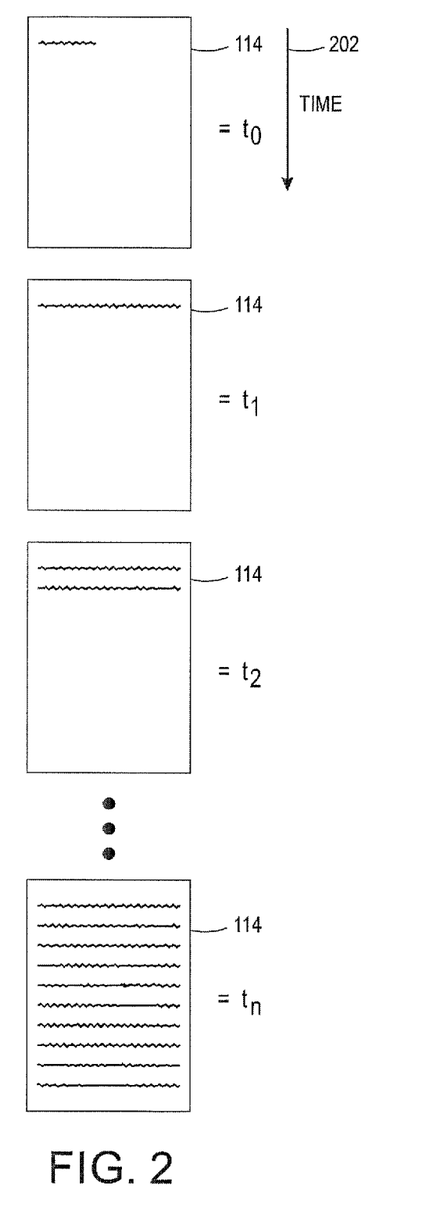
FIG. 2 illustrates an example of a document that is printed on the paper-like device.

FIG. 2 illustrates one example of how the document 130 is printed on the paper-like device 114. FIG. 2 illustrates a timeline 202 from time $t_0$ where the printing begins to $t_n$ when the printing is complete. As illustrated in FIG. 2, the document 130 may be printed on the paper-like device 114 to make it appears as if it was being printed out of a printer. In other words, the paper-like device 114 may display the document 130 line-by-line from left to right as illustrated in time $t_0$, $t_1$, $t_2$ to $t_n$. In other words, unlike currently used displays where all of the pixels are illuminated simultaneously based upon an image, the paper-like device 114 may "print" the document 130 line-by-line similar to a printer.

It should be noted that the "printing" may occur rather quickly. For example, the paper-like device 114 may print the document 130 line-by-line slowly enough that it is noticeable by a user. However, the entire document 130 may be printed on the paper-like device 114 in a few seconds. Said another way, the speed of the printing to the paper-like device 114 may be comparable to the speed of pages per minute of current high speed laser printers.

Figure 3:
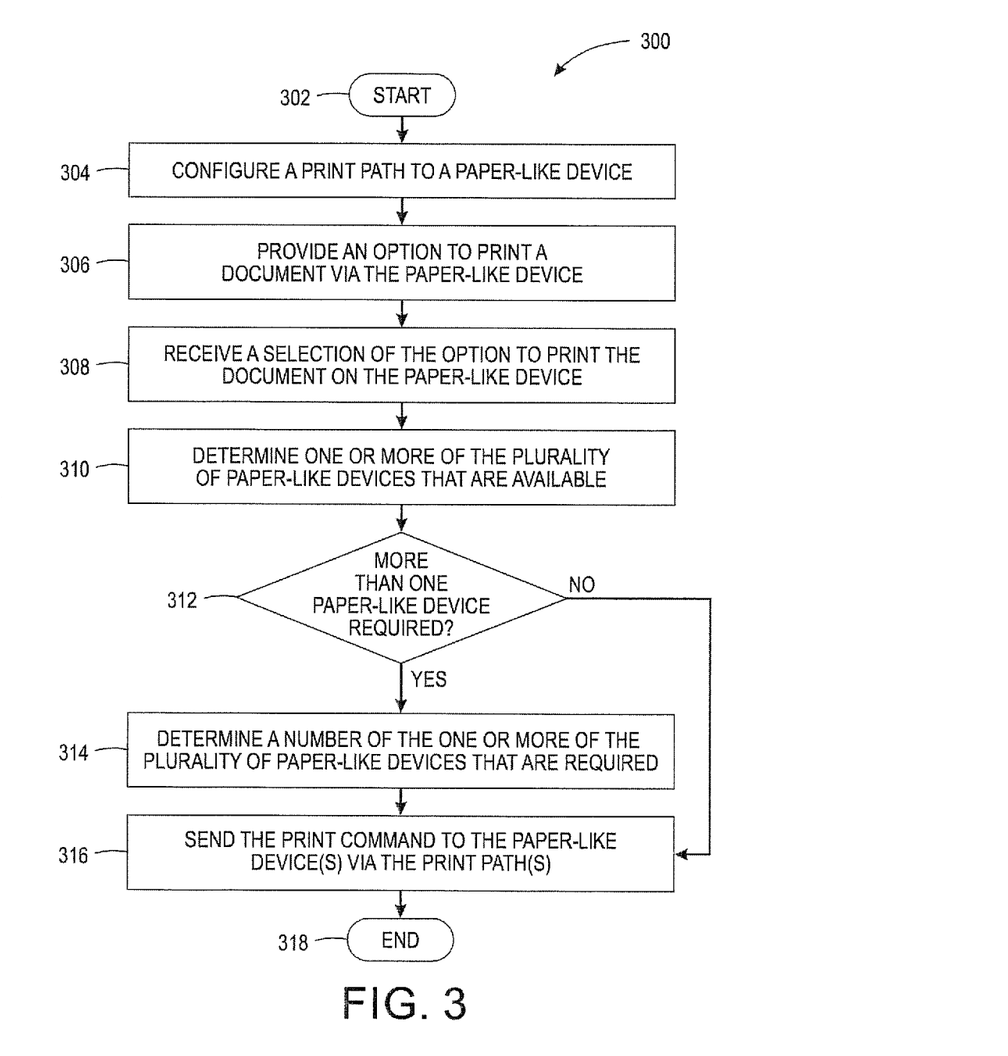
FIG. 3 illustrates an example flowchart of a method for printing on a paper-like device.
Figure 4:
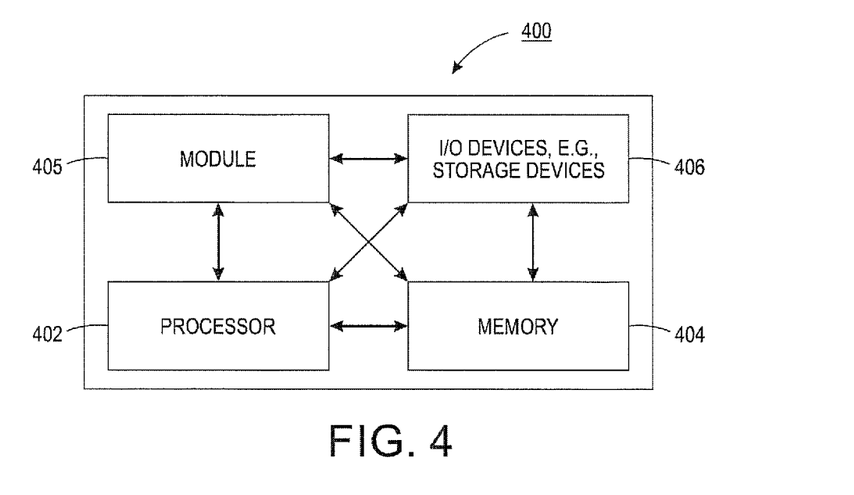
FIG. 4 illustrates a high-level block diagram of a computer suitable for use in performing the functions described herein.

FIG. 3 illustrates a flowchart of a method 300 for printing on a paper-like device. In one embodiment, one or more steps or operations of the method 300 may be performed by the endpoint device 102 or a computer as illustrated in FIG. 4 and discussed below.

At block 302 the method 300 begins. At block 304, the method 300 configures a print path to a paper-like device. In one embodiment, the endpoint device may configure or create a print path for each one of the paper-like devices. For example, the print path may be configured using a driver that is installed on the endpoint device that allows the endpoint device to recognize and communicate with each one of the paper-like devices. In one embodiment, the print path may use printing communication protocols such as a page description language (PDL) (e.g., PostScript, and the like). In one embodiment, the print path may be via a wireless connection or a wired connection.

At block 306, the method 300 provides an option to print a document via the paper-like device. In one embodiment, the option to print the document via the paper-like device may be provided as a GUI on a display of the endpoint device. The GUI may include a drop down menu that includes the paper-like device as one of the options to send a print command. For example, the drop down menu may be similar to the drop down menu that includes printers that are available for printing.

At block 308, the method 300 receives a selection of the option to print the document on the paper-like device. In one embodiment, the user may select the paper-like device from the option to print the document. In one embodiment, the GUI may provide the user with a unique ID of the paper-like devices that are used to print the document. In one embodiment, a password may be provided to the user and distributed to the paper-like devices to ensure that only the user that originated the print command may access the document on the paper-like devices that the document is printed on.

At block 310, the method 300 determines one or more of the plurality of paper-like devices that are available. In one embodiment, the paper-like devices may be located remotely at a print station. For example, a company may locate a plurality of paper-like devices at a print station from which employees may pick up the paper-like device or devices that printed the document. A print management service or service provider may track the inventory of the paper-like devices that are used and available. The inventory may be shared with the endpoint device such that the endpoint device knows which paper-like devices are available that can receive the print command.

In one embodiment, if no paper-like devices are available the user may be notified via the GUI that no paper-like devices are available currently for printing. In one embodiment, the user may be provided an option or recommendation to send the print command to an available printer. Alternatively, the user may wait until a paper-like device is available. In one embodiment, when the endpoint device determines that a paper-like device is available based on the inventory, the endpoint device may automatically send the print command to the paper-like device that is available at a later time. In other words, the endpoint device may queue or hold the print command until a paper-like device becomes available if none are available immediately at the time the user submits the print command and does not wish to use a traditional printer and paper for printing the document.

At block 312, the method 300 determines if more than one paper-like device is required. In one embodiment, the determination may be made based upon the number of pages in the document and/or a finishing option that is selected. For example, if the document has multiple pages and does not require stapling, this print command may be interpreted as printing each page on a separate paper-like device. If more than one paper-like device is required, the method 300 may proceed to block 314.

At block 314, the method 300 determines a number of the one or more of the plurality of paper-like devices that are required. The number may be based on the number of pages in the document and the finishing options that are selected (e.g., double sided, stapled, and the like). The method 300 may then proceed to block 316.

Referring back to block 312, if only one paper-like device is required, the method may proceed directly to block 316. At block 316, the method 300 sends the print command to the paper-like device or devices via the print path or paths. In one embodiment, if more than one paper-like device is required, the print command may be sent via each separate print path that was configured at step 304 for each respective paper-like device.

It should be noted that the document is being "printed" onto the paper-like device. The document is not being "displayed" on the paper-like device. In other words, the document appears on the paper-like device in response to a print command issued from the endpoint device. The document is not displayed from a saved filed stored in a file directory system on a computer, a file directory system on a portable hard disk drive, a server hosting a website, and the like. Said another way, the document appears on the paper-like device using a PDL or PostScript typically used for printers to print documents and images on a print media. At block 318 the method 300 ends.

It should be noted that although not explicitly specified, one or more steps, functions, or operations of the method 300 described above may include a storing, displaying and/or outputting step as required for a particular application. In other words, any data, records, fields, and/or intermediate results discussed in the methods can be stored, displayed, and/or outputted to another device as required for a particular application. Furthermore, steps, functions, or operations in FIG. 3 that recite a determining operation, or involve a decision, do not necessarily require that both branches of the determining operation be practiced. In other words, one of the branches of the determining operation can be deemed as an optional step.

As a result, the embodiments of the present disclosure improve the functioning of a computer or a device. For example, the functioning of a computer may be improved to print a document without using a printer. In other words, print commands cause a document to be printed on a paper-like device that feels and appears like paper without requiring a printer. In addition, the embodiments of the present disclosure transform a print command traditionally used to cause a printer to print a document on paper to cause a document to be "printed" onto a paper-like device, as discussed above. Notably, no previous machine or computer was capable of performing the functions described herein as the present disclosure provides an improvement in the technological arts of printing.

FIG. 4 depicts a high-level block diagram of a computer that can be transformed to into a machine that is dedicated to perform the functions described herein. Notably, no computer or machine currently exists that performs the functions as described herein. As a result, the embodiments of the present disclosure improve the operation and functioning of the computer to provide printing on a paper-like device, as disclosed herein.

As depicted in FIG. 4, the computer 400 comprises one or more hardware processor elements 402 (e.g., a central processing unit (CPU), a microprocessor, or a multi-core processor), a memory 404, e.g., random access memory (RAM) and/or read only memory (ROM), a module 405 for printing on a paper-like device, and various input/output devices 406 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computer may employ a plurality of processor elements. Furthermore, although only one computer is shown in the figure, if the method(s) as discussed above is implemented in a distributed or parallel manner for a particular illustrative example, i.e., the steps of the above method(s) or the entire method(s) are implemented across multiple or parallel computers, then the computer of this figure is intended to represent each of those multiple computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 405 for printing on a paper-like device (e.g., a software program comprising computer-executable instructions) can be loaded into memory 404 and executed by hardware processor element 402 to implement the steps, functions or operations as discussed above in connection with the exemplary method 300. Furthermore, when a hardware processor executes instructions to perform "operations", this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 405 for printing on a paper-like device (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for printing on a paper-like device, comprising:
   configuring, by a processor of a computer endpoint device, a print path from the computer endpoint device to the paper-like device of a plurality of paper-like devices via a driver installed on the computer endpoint device to allow the computer endpoint device to use printing communication protocols;
   receiving, by the processor, a unique identification (ID) for each one of the plurality of paper-like devices from a respective one of the plurality of paper-like devices of a plurality of employees, wherein the each one of the plurality of paper-like devices is associated with a different employee of the plurality of employees;
providing, by the processor, an option to print a document on the paper-like device, wherein the option to print displays the unique ID received from the respective one of the plurality of paper-like devices of the plurality of employees for each one of the plurality of paper-like devices on a graphical user interface;
receiving, by the processor, a selection of the option to print the document on the paper-like device by selection of a respective unique ID associated with the paper-like device; and
sending, by the processor, a print command to the paper-like device based on the respective unique ID that was selected via the print path to print the document on the paper-like device.

2. The method of claim 1, wherein the each one of the plurality of paper-like devices comprises a different size, wherein the option to print the document via the paper-like device comprises a paper size option, wherein the sending the print command comprises sending the print command to one of the plurality of paper-like devices that is equivalent to the paper size option that is selected.

3. The method of claim 1, wherein the document comprises a plurality of pages and each one of the plurality of pages is printed on a different one of the plurality of paper-like devices.

4. The method of claim 1, wherein the sending the print command further comprises:
storing, by the processor, each one of a plurality of pages of the document in a storage cache remotely located from the paper-like device;
printing, by the processor, a first page of the document on the paper-like device from the storage cache;
receiving, by the processor, a signal that the first page has been processed; and
repeating, by the processor, the printing and the receiving until all pages of the plurality of pages of the document have been processed.

5. The method of claim 4, wherein the signal that the first page has been processed indicates that the first page has been read or that the first page has been stored.

6. The method of claim 1, wherein the print command is sent wirelessly using the respective unique ID of the paper-like device.

7. The method of claim 1, wherein the document is printed on the paper-like device by displaying the document line-by-line.

8. A non-transitory computer-readable medium storing a plurality of instructions, which when executed by a processor of a computer endpoint device, cause the processor to perform operations for printing on a paper-like device, comprising:
configuring a print path from the computer endpoint device to the paper-like device of a plurality of paper-like devices via a driver installed on the computer endpoint device to allow the computer endpoint device to use printing communication protocols;
receiving a unique identification (ID) for each one of the plurality of paper-like devices from a respective one of the plurality of paper-like devices of a plurality of employees, wherein the each one of the plurality of paper-like devices is associated with a different employee of the plurality of employees;
providing an option to print a document on the paper-like device, wherein the option to print displays the unique ID received from the respective one of the plurality of paper-like devices of the plurality of employees for each one of the plurality of paper-like devices on a graphical user interface;
receiving a selection of the option to print the document on the paper-like device by selection of a respective unique ID associated with the paper-like device; and
sending a print command to the paper-like device based on the respective unique ID that was selected via the print path to print the document on the paper-like device.

9. The non-transitory computer-readable medium of claim 8, wherein each one of the plurality of paper-like devices comprises a different size, wherein the option to print the document via the paper-like device comprises a paper size option, wherein the sending the print command comprises sending the print command to one of the plurality of paper-like devices that is equivalent to the paper size option that is selected.

10. The non-transitory computer-readable medium of claim 8, wherein the document comprises a plurality of pages and each one of the plurality of pages is printed on a different one of the plurality of paper-like devices.

11. The non-transitory computer-readable medium of claim 8, wherein the sending the print command further comprises:
storing each one of a plurality of pages of the document in a storage cache remotely located from the paper-like device;
printing a first page of the document on the paper-like device from the storage cache;
receiving a signal that the first page has been processed; and
repeating the printing and the receiving until all pages of the plurality of pages of the document have been processed.

12. The non-transitory computer-readable medium of claim 11, wherein the signal that the first page has been processed indicates that the first page has been read or that the first page has been stored.

13. The non-transitory computer-readable medium of claim 8, wherein the print command is sent wirelessly using the respective unique ID of the paper-like device.

14. The non-transitory computer-readable medium of claim 8, wherein the document is printed on the paper-like device by displaying the document line-by-line.

15. A method for printing on a paper-like device, comprising:
configuring, by a processor of a computer endpoint device, a print path from the computer endpoint device to a plurality of paper-like devices via a driver installed on the computer endpoint device to allow the computer endpoint device to use printing communication protocols;
receiving, by the processor, a unique identification (ID) for each one of the plurality of paper-like devices from a respective one of the plurality of paper-like devices of a plurality of employees, wherein the each one of the plurality of paper-like devices is associated with a different employee of the plurality of employees;
providing, by the processor, an option to print a document via one or more paper-like devices of the plurality of paper-like devices, wherein the providing comprises displaying the unique ID received from the respective one of the plurality of paper-like devices of the plurality of employees, wherein the unique ID is associated with the each one of the plurality of paper-like devices on a graphical user interface;

receiving, by the processor, a selection of the option to print the document on the plurality of paper-like devices by selection of a respective unique ID associated with the each one of the plurality of paper like devices that is selected; and sending, by the processor, a print command to the plurality of paper-like devices based on the respective unique ID associated with the each one of the plurality of paper-like devices via the print path to print the document.

\* \* \* \* \*